US011900850B2

(12) United States Patent
Pyun et al.

(10) Patent No.: US 11,900,850 B2
(45) Date of Patent: *Feb. 13, 2024

(54) DISPLAY DEVICE AND METHOD OF DRIVING THE SAME

(71) Applicant: Samsung Display Co., Ltd., Yongin-si (KR)

(72) Inventors: Kihyun Pyun, Gwangmyeong-si (KR); Sung-Mo Yang, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,559

(22) Filed: Mar. 13, 2023

(65) Prior Publication Data

US 2023/0215327 A1 Jul. 6, 2023

Related U.S. Application Data

(63) Continuation of application No. 17/556,163, filed on Dec. 20, 2021, now Pat. No. 11,605,331.

(30) Foreign Application Priority Data

Mar. 25, 2021 (KR) ........................ 10-2021-0038847

(51) Int. Cl.
*G09G 3/20* (2006.01)

(52) U.S. Cl.
CPC ......... *G09G 3/2007* (2013.01); *G09G 3/2092* (2013.01); *G09G 2300/0828* (2013.01);
(Continued)

(58) Field of Classification Search
None
See application file for complete search history.

(56) References Cited

U.S. PATENT DOCUMENTS 10,311,799 B2 6/2019 Park et al.
2009/0051628 A1 2/2009 Kwon
(Continued)

FOREIGN PATENT DOCUMENTS

KR 100639005 B1 10/2006
KR 100844770 B1 7/2008
(Continued)

*Primary Examiner* — kenneth bukowski
(74) *Attorney, Agent, or Firm* — CANTOR COLBURN LLP

(57) ABSTRACT

A display device may include a display panel which displays an image based on a data voltage, a driving controller including a net power control setter which determines a scale factor for adjusting a gray scale of $(N+1)^{th}$ frame data based on a load of $N^{th}$ frame data and a net power control reference value, where the driving controller generates a data signal based on input image data, and N is a natural number greater than or equal to 2, a data driver which converts the data signal into the data voltage and outputs the data voltage to the display panel, and a power supply voltage generator which senses a power supply current applied to the display panel in an $N^{th}$ frame and generates a power supply voltage based on a current level of the power supply current.

18 Claims, 7 Drawing Sheets

(52) U.S. Cl.
CPC ............... *G09G 2310/0243* (2013.01); *G09G 2310/0275* (2013.01); *G09G 2310/08* (2013.01); *G09G 2320/0271* (2013.01); *G09G 2330/028* (2013.01); *G09G 2330/04* (2013.01); *G09G 2360/16* (2013.01)

(56) References Cited

U.S. PATENT DOCUMENTS

| | | | |
|---|---|---|---|
| 2009/0109147 | A1 | 4/2009 | Park et al. |
| 2014/0354710 | A1 | 12/2014 | Jun et al. |
| 2016/0155382 | A1 | 6/2016 | Cheon et al. |
| 2021/0174762 | A1 | 6/2021 | Sun et al. |
| 2021/0350751 | A1 | 11/2021 | Lee et al. |
| 2022/0044617 | A1 | 2/2022 | Pyun et al. |

FOREIGN PATENT DOCUMENTS

| | | | |
|---|---|---|---|
| KR | 100893482 | B1 | 4/2009 |
| KR | 100894606 | B1 | 4/2009 |

DISPLAY DEVICE AND METHOD OF DRIVING THE SAME

This application is a continuation of U.S. patent application Ser. No. 17/556,163, filed on Dec. 20, 2021, which claims priority to Korean Patent Application No. 10-2021-0038847, filed on Mar. 25, 2021, and all the benefits accruing therefrom under 35 U.S.C. § 119, the content of which in its entirety is herein incorporated by reference.

BACKGROUND

1. Field

Embodiments relate generally to a display device and a method of driving the display device. More particularly, embodiments relate to a display device that adjusts a luminance of a display panel based on a load of input image data and prevents the display panel from being damaged by occurrence of an overcurrent and a method of driving the display device.

2. Description of the Related Art

In general, a display device includes a display panel and a display panel driver. The display panel is configured to display an image based on input image data, and typically includes a plurality of gate lines, a plurality of data lines, and a plurality of pixels. The display panel driver includes a gate driver configured to provide gate signals to the gate lines, a data driver configured to provide data voltages to the data lines, and a driving controller configured to control the gate driver and the data driver.

If a luminance of the display panel is not adjusted based on a load of input image data, an overcurrent may flow in the data driver or the display panel, thereby damaging the data driver or the display panel.

SUMMARY

In a display device where a luminance of a display panel is adjusted based on a load of input image data, delay of one frame may occur in a process of determining a load of input image data. Due to the delay of one frame, when input image data that does not use a luminance adjustment function is input in an $(N-1)^{th}$ frame and when input image data that use the luminance adjustment function is input in an $N^{th}$ frame, the luminance adjustment function may not immediately operate in the $N^{th}$ frame, so that an overcurrent may flow in the display panel during the $N^{th}$ frame. As a result, the display panel or the data driver may be damaged.

Embodiments of the disclosure are to provide a display device capable of preventing a display panel from being damaged by occurrence of an overcurrent by sensing a power supply current applied to the display panel and controlling a power supply voltage based on a level of the power supply current. Other embodiments of the disclosure are to provide a method of driving a display device capable of preventing a display panel from being damaged by occurrence of an overcurrent by sensing a power supply current applied to the display panel and controlling a power supply voltage based on a level of the power supply current.

According to an embodiment of the invention, a display device includes a display panel which displays an image based on a data voltage, a driving controller including a net power control setter which determines a scale factor for adjusting a gray scale of $(N+1)^{th}$ frame data based on a load of $N^{th}$ frame data and a net power control reference value, where the driving controller generates a data signal based on input image data, and N is a natural number greater than or equal to 2, a data driver which converts the data signal into the data voltage and outputs the data voltage to the display panel, and a power supply voltage generator which senses a power supply current applied to the display panel in an $N^{th}$ frame and generates a power supply voltage based on a current level of the power supply current.

In an embodiment, the power supply voltage generator may include a power supply voltage generation block which generates the power supply voltage, a current sensing block which senses the power supply current and to generate a voltage drop signal based on the current level of the power supply current and a reference current lookup table, a voltage code generation block which outputs a power supply voltage code based on the voltage drop signal and a voltage code lookup table, and a power supply voltage digital-to-analog converter ("DAC") block which generates an analog voltage corresponding to the power supply voltage code.

In an embodiment, the current sensing block may receive a reference current from the reference current lookup table, may compare the power supply current with the reference current, and may output the voltage drop signal with an activation level when the power supply current is greater than the reference current.

In an embodiment, the reference current lookup table may store a first reference current, a second reference current which is greater than the first reference current, and a third reference current which is greater than the second reference current.

In an embodiment, the current sensing block may output a first voltage drop signal with an activation level when the power supply current is greater than the first reference current, may output a second voltage drop signal with an activation level when the power supply current is greater than the second reference current, and may output a third voltage drop signal with an activation level when the power supply current is greater than the third reference current.

In an embodiment, the voltage code generation block may receive the voltage drop signal from the current sensing block, may receive a vertical start signal from the driving controller, and may calculate an activation start time of the voltage drop signal based on the vertical start signal.

In an embodiment, the voltage code generation block may output the power supply voltage code corresponding to a type of the voltage drop signal and the activation start time of the voltage drop signal among a plurality of power supply voltage codes stored in the voltage code lookup table.

In an embodiment, the power supply voltage generation block may receive the analog voltage from the power supply voltage DAC block and may control a voltage level of the power supply voltage based on the analog voltage.

In an embodiment, the driving controller may further includes a load sum calculator which receives the $N^{th}$ frame data to calculate a sum of all gray scales of the Nth frame data.

In an embodiment, the driving controller may further include a load calculator which receives the sum of all gray scales of the $N^{th}$ frame data to calculate the load of the $N^{th}$ frame data. According to another embodiment of the invention, a method of driving a display device includes determining a scale factor for adjusting a gray scale of $(N+1)^{th}$ frame data based on a load of $N^{th}$ frame data and a net power control reference value, where N is a natural number greater than or equal to 2, compensating input image data based on the scale factor, generating a data signal based on the compensated input image data, converting the data signal into a data voltage to output the data voltage to a display panel of the display device, sensing a power supply current applied to the display panel in an $N^{th}$ frame, and generating a power supply voltage based on a current level of the power supply current.

In an embodiment, the generating the power supply voltage may include generating a voltage drop signal based on the current level of the power supply current and a reference current lookup table, outputting a power supply voltage code based on the voltage drop signal and a voltage code lookup table, and generating an analog voltage corresponding to the power supply voltage code.

In an embodiment, the generating of voltage drop signal may include receiving a reference current from the reference current lookup table, comparing the power supply current with the reference current, and outputting the voltage drop signal with an activation level when the power supply current is greater than the reference current.

In an embodiment, the reference current lookup table may store a first reference current, a second reference current which is greater than the first reference current, and a third reference current which is greater than the second reference current. In an embodiment, the generating the voltage drop signal may include outputting a first voltage drop signal with an activation level when the power supply current is greater than the first reference current; outputting a second voltage drop signal with an activation level when the power supply current is greater than the second reference current; and outputting a third voltage drop signal with an activation level when the power supply current is greater than the third reference current.

In an embodiment, the outputting the power supply voltage code may include calculating an activation start time of the voltage drop signal based on a vertical start signal.

In embodiments, the outputting the power supply voltage code may include outputting the power supply voltage code corresponding to a type of the voltage drop signal and the activation start time of the voltage drop signal among a plurality of power supply voltage codes stored in the voltage code lookup table.

In an embodiment, the generating the power supply voltage may further include controlling a voltage level of the power supply voltage based on the analog voltage.

In an embodiment, the method of driving the display device may further include receiving the $N^{th}$ frame data to calculate a sum of all gray scales of the Nth frame data.

In an embodiment, the method of driving the display device may further include receiving the sum of all gray scales of the $N^{th}$ frame data to calculate the load of the $N^{th}$ frame data.

In such embodiments, a display device and a method of driving the display device may sense a power supply current applied to a display panel and may control a power supply voltage based on a level of the power supply current. Thus, the display device and the method of driving the display device may control a voltage level of the power supply voltage when an overcurrent flows in the display panel, so that occurrence of the overcurrent may be minimized (or reduced), and the display panel can be prevented from being damaged.

DETAILED DESCRIPTION

Figure 1:
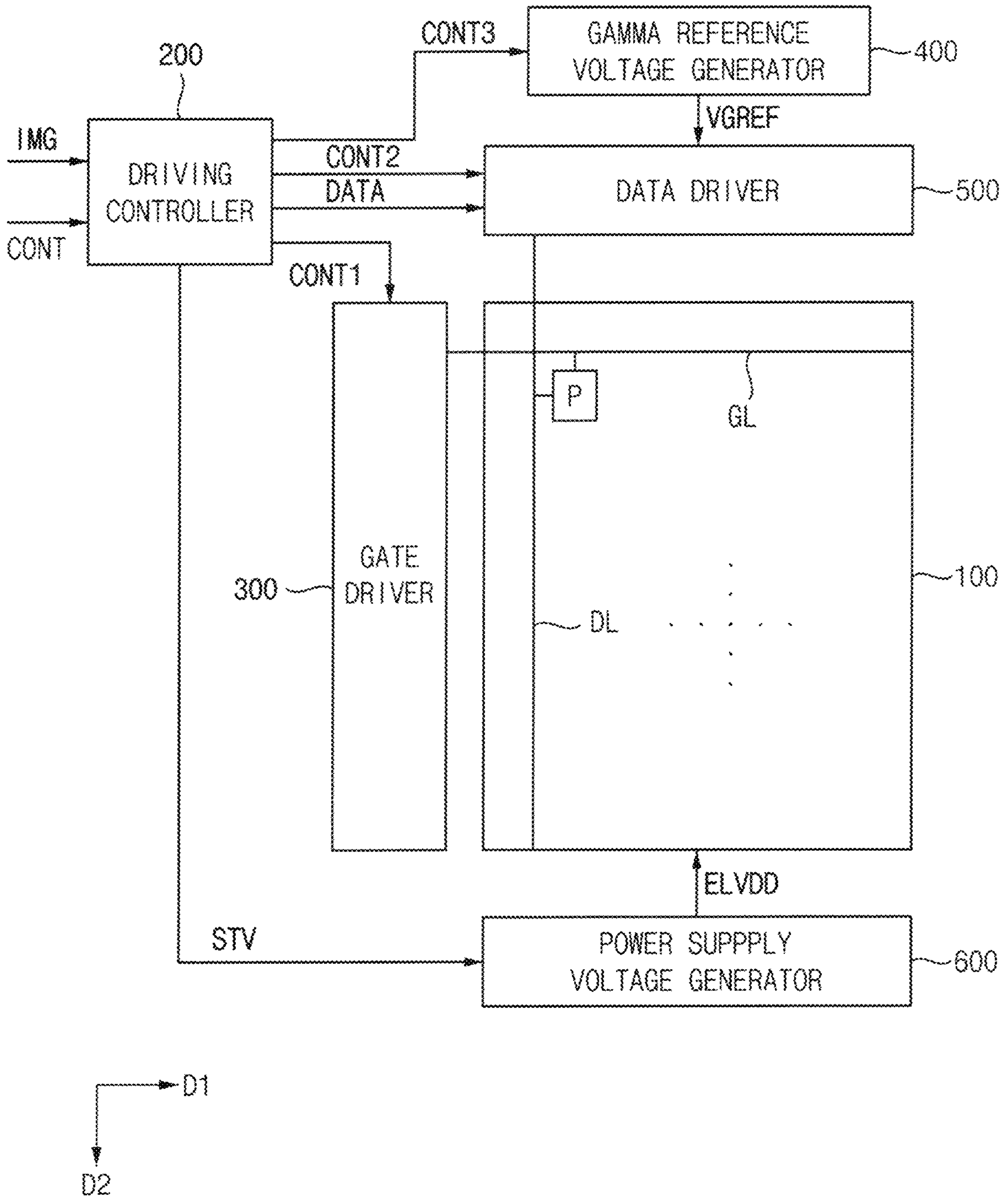
FIG. 1 is a block diagram showing a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/ or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

FIG. 1 is a block diagram showing a display device according to an embodiment.

Referring to FIG. 1, an embodiment of a display device may include a display panel 100 and a display panel driver. The display panel driver may include a driving controller 200, a gate driver 300, a gamma reference voltage generator 400, a data driver 500, and a power supply voltage generator 600.

In one embodiment, for example, the driving controller 200 and the data driver 500 may be formed integrally with each other. In one embodiment, for example, the driving controller 200, the gamma reference voltage generator 400, and the data driver 500 may be formed integrally with each other in a single unit or module (e.g., a chip). A driving module in which at least the driving controller 200 and the data driver 500 are formed integrally with each other may be referred to as a timing controller-embedded data driver ("TED").

The display panel 100 may include a display part for displaying an image, and a peripheral part that is adjacent to the display part.

The display panel 100 may include a plurality of gate lines GL, a plurality of data lines DL, and pixels P electrically connected to the gate lines GL and the data lines DL, respectively. The gate lines GL may extend in a first direction D1, and the data lines DL may extend in a second direction D2 intersecting the first direction D1.

The driving controller 200 may receive input image data IMG and an input control signal CONT from an external device (not shown). In one embodiment, for example, the input image data IMG may include red image data, green image data, and blue image data. The input image data IMG may further include white image data. In one embodiment, for example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT. The driving controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT to output the generated second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT to output the generated third control signal CONT3 to the gamma reference voltage generator 400. The driving controller 200 will be described in detail below with reference to FIGS. 2 and 3.

The gate driver 300 may generate gate signals for driving the gate lines GL in response to the first control signal CONT1 received from the driving controller 200. The gate driver 300 may output the gate signals to the gate lines GL. In one embodiment, for example, the gate driver 300 may sequentially output the gate signals to the gate lines GL. In one embodiment, for example, the gate driver 300 may be mounted on the peripheral part of the display panel. In one embodiment, for example, the gate driver 300 may be integrated on the peripheral part of the display panel.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or the data driver 500.

The data driver 500 may receive the second control signal CONT2 and the data signal DATA from the driving controller 200, and may receive the gamma reference voltage VGREF from the gamma reference voltage generator 400.

The data driver 500 may convert the data signal DATA into an analog data voltage by using the gamma reference voltage VGREF. The data driver 500 may output the data voltage to the data line DL.

The power supply voltage generator 600 may generate a voltage for driving at least one of the display panel 100, the driving controller 200, the gate driver 300, the gamma reference voltage generator 400, and the data driver 500. In one embodiment, for example, the power supply voltage generator 600 may generate a low power supply voltage, and output the low power supply voltage to the pixel P. In an embodiment, the power supply voltage generator 600 may generate an analog power supply voltage, and output the analog power supply voltage to the data driver 500. In an embodiment, the power supply voltage generator 600 may generate a high gate voltage and a low gate voltage, and output the high gate voltage and the low gate voltage to the gate driver 300. In such an embodiment, the power supply voltage generator 600 may include a direct current-to-direct current ("DC-DC") converter.

In an embodiment, the power supply voltage generator 600 may receive a vertical start signal STV from the driving controller 200. The vertical start signal STV may be a signal representing the start of one frame. The power supply voltage generator 600 may generate a power supply voltage ELVDD based on the vertical start signal STV. The power supply voltage generator 600 may output the power supply voltage ELVDD to the display panel 100.

The power supply voltage generator 600 will be described in detail below with reference to FIGS. 4 to 7.

Figure 2:
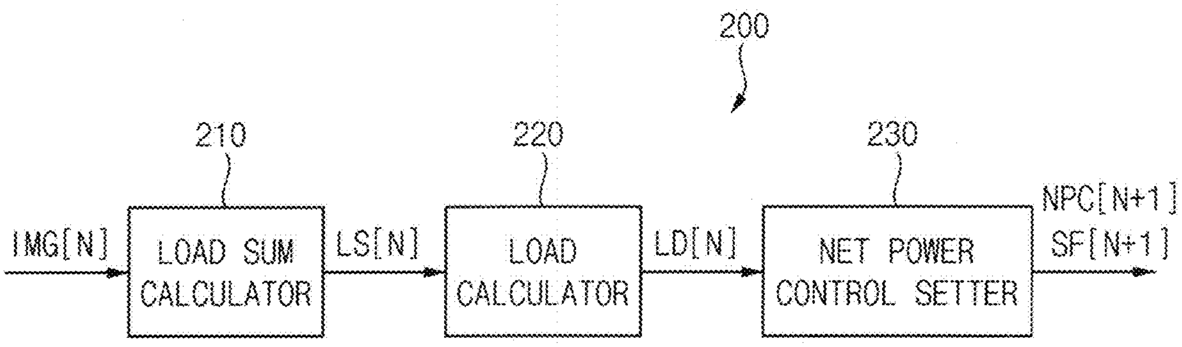
FIG. 2 is a block diagram showing an embodiment of a driving controller included in the display device of FIG. 1.
Figure 3:
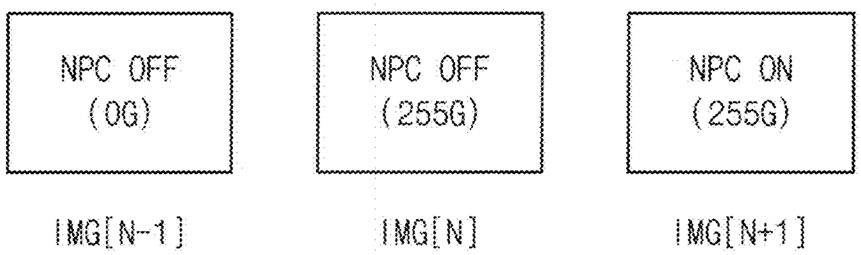
FIG. 3 is a conceptual diagram showing input image data of a driving controller included in the display device of FIG. 1 when $(N-1)^{th}$ frame data represents a 0-th gray scale and each of $N^{th}$ frame data and $(N+1)^{th}$ frame data represents a 255-th gray scale in FIG. 2.

FIG. 2 is a block diagram showing an embodiment of a driving controller included in the display device of FIG. 1, and FIG. 3 is a conceptual diagram showing input image data of a driving controller included in the display device of FIG. 1 when $(N-1)^{th}$ frame data IMG[N-1] represents a 0-th gray scale and each of $N^{th}$ frame data IMG[N] and $(N+1)^{th}$ frame data IMG[N+1] represents a 255-th gray scale in FIG. 2. Referring to FIGS. 1 to 3, an embodiment of the driving controller 200 may include a load sum calculator 210, a load calculator 220, and a net power control setter 230.

The load sum calculator 210 may receive $N^{th}$ frame data IMG[N] to calculate a sum LS[N] of all gray scales of the $N^{th}$ frame data IMG[N]. In one embodiment, for example, the load sum calculator 210 may divide the display panel 100 into a plurality of blocks to calculate a sum of gray scales of each of the blocks. The load sum calculator 210 may sum up sums of the gray scales of the blocks to calculate the sum LS[N] of all gray scales of the $N^{th}$ frame data IMG[N]. Here, N is a natural number greater than or equal to 2.

The load calculator 220 may receive the sum LS[N] of all gray scales of the N th frame data IMG[N] to calculate a load LD[N] of the $N^{th}$ frame data IMG[N]. The load LD[N] may have a value from 0% to 100%. In one embodiment, for example, when the N th frame data IMG[N] has a full black image, the load LD[N] may be 0%. In such an embodiment, when the $N^{th}$ frame data IMG[N] has a full white image, the load LD[N] may be 100%.

In an embodiment, the net power control setter 230 may determine a scale factor SF[N+1] for adjusting a gray scale of $(N+1)^{th}$ frame data based on the load LD[N] of the N th frame data IMG[N] and a net power control reference value. In such an embodiment, the net power control setter 230 may generate a net power control signal NPC[N+1] representing whether net power control is activated or deactivated in the $(N+1)^{th}$ frame data. The scale factor SF[N+1] may have a value that is less than or equal to 1 to maintain or reduce a gray scale of the input image data.

The net power control setter 230 may activate the net power control when the load LD[N] of the $N^{th}$ frame data IMG[N] exceeds the net power control reference value.

The net power control setter 230 may allow the scale factor SF[N+1] to have a value that is less than 1 when the net power control is activated because the load LD[N] of the $N^{th}$ frame data IMG[N] exceeds the net power control reference value. In one embodiment, for example, when the scale factor SF[N+1] is 0.5, the gray scale of the $(N+1)^{th}$ frame data IMG[N+1] may be reduced by half as compared with an input gray scale.

As shown in FIG. 2, a delay of one frame may occur in order for the net power control setter 230 to determine the scale factor SF[N+1]. Therefore, the net power control setter 230 may generate the scale factor SF[N+1] applied to the $(N+1)^{th}$ frame data IMG[N+1] based on the $N^{th}$ frame data IMG[N]. As described above, when the delay of one frame occurs, the net power control may not be immediately applied in the $N^{th}$ frame, so that an overcurrent may flow in the display panel 100 and the data driver 500.

As shown in FIG. 3, when $(N-1)^{th}$ frame data represents a 0-th gray scale, for example, and each of the $N^{th}$ frame data and the $(N+1)^{th}$ frame data represents a 255-th gray scale, due to the delay of one frame, the net power control may not operate in the $N^{th}$ frame (NPC OFF). In this case, a luminance of a display image of the $N^{th}$ frame may be high, and a power supply current applied to the display panel 100 in the $N^{th}$ frame may have an overcurrent level. As described above, when the overcurrent flows in the display panel 100, display quality may deteriorate, or the display panel 100 may be damaged.

In an embodiment of the invention, the display device may be configured to sense the power supply current applied to the display panel 100, and generate the power supply voltage based on a current level of the power supply current such that an overcurrent may be effectively prevented from flowing in the display panel 100.

Figure 4:
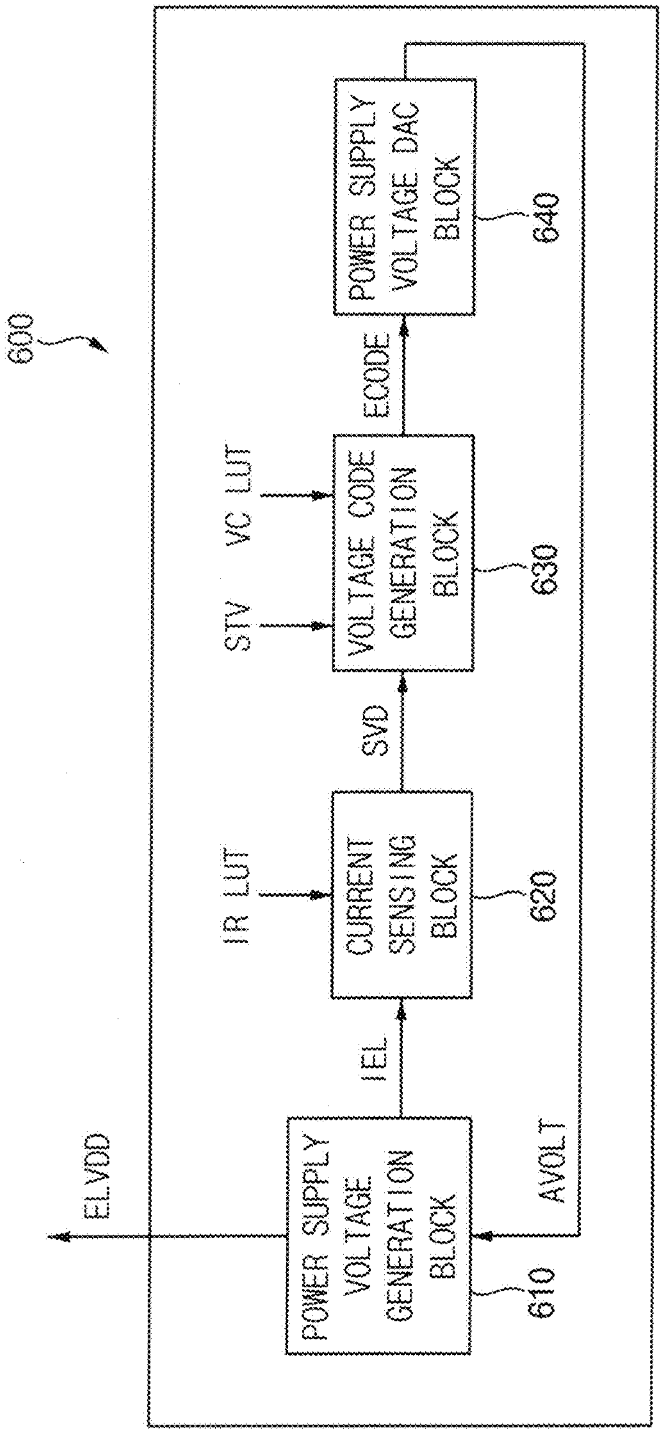
FIG. 4 is a block diagram showing an embodiment of power supply voltage generator included in the display device of FIG. 1.
Figure 5:
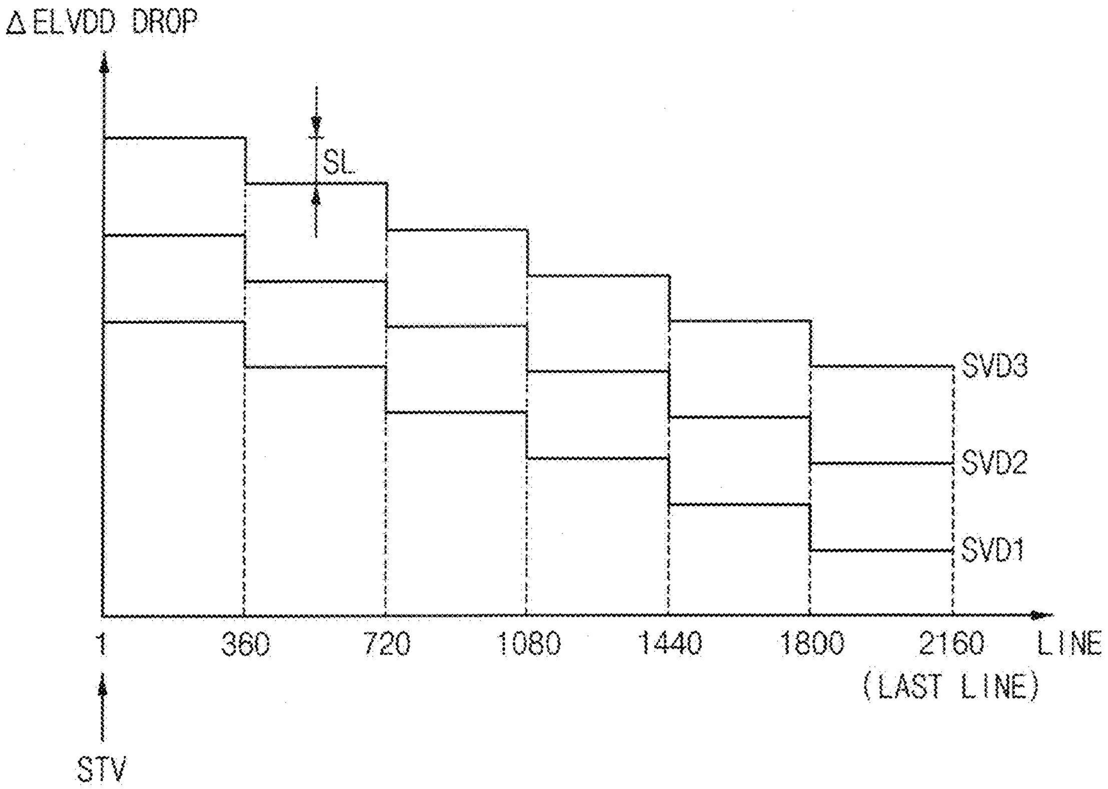
FIG. 5 is a graph showing drop data of a power supply voltage stored in a voltage code lookup table.

FIG. 4 is a block diagram showing an embodiment of a power supply voltage generator included in the display device of FIG. 1, and FIG. 5 is a graph showing drop data of a power supply voltage stored in a voltage code lookup table.

Referring to FIGS. 1 and 3 to 5, an embodiment of the power supply voltage generator 600 may sense the power supply current IEL applied to the display panel 100 and generate the power supply voltage ELVDD based on the current level of the power supply current IEL in the $N^{th}$ frame in which the net power control does not operate. The power supply voltage generator 600 may include a power supply voltage generation block 610, a current sensing block 620, a voltage code generation block 630, and a power supply voltage digital-to-analog converter ("DAC") block 640. The power supply voltage generator 600 may generate the power supply voltage ELVDD, and output the power supply voltage ELVDD to the display panel 100.

The current sensing block 620 may sense the power supply current IEL, and generate a voltage drop signal SVD based on the current level of the power supply current IEL and a reference current lookup table IR LUT. The current sensing block 620 may receive the power supply current IEL from the power supply voltage generation block 610. The current sensing block 620 may receive a reference current from the reference current lookup table IR LUT. The current sensing block 620 may compare the power supply current IEL with the reference current. The current sensing block 620 may output the voltage drop signal SVD with an activation level when the power supply current IEL is greater than the reference current.

In an embodiment, the current sensing block 620 may receive the power supply current IEL from the power supply voltage generation block 610. When the net power control does not operate in the $N^{th}$ frame, the power supply current IEL applied to the display panel 100 in the $N^{th}$ frame may have the overcurrent level. The current sensing block 620 may sense whether the power supply current IEL has the overcurrent level. In such an embodiment, the current sensing block 620 may receive the reference current from the reference current lookup table IR LUT to sense whether the power supply current IEL has the overcurrent level.

The reference current lookup table IR LUT may store a plurality of reference currents. In one embodiment, for example, the reference current lookup table IR LUT may include a first reference current IR1, a second reference current IR2, and a third reference current IR3 (shown in FIG. 7). The second reference current IR2 may be greater than the first reference current IR1. The third reference current IR3 may be greater than the second reference current IR2.

In an embodiment, the current sensing block 620 may compare the power supply current IEL with the first reference current IR1. When the power supply current IEL is greater than the first reference current IR1, a first voltage drop signal SVD1 may be output with an activation level. In such an embodiment, the current sensing block 620 may compare the power supply current IEL with the second reference current IR2. When the power supply current IEL is greater than the second reference current IR2, a second voltage drop signal SVD2 may be output with an activation level. In such an embodiment, the current sensing block 620 may compare the power supply current IEL with the third reference current IR3. When the power supply current IEL is greater than the third reference current IR3, a third voltage drop signal SVD3 may be output with an activation level.

The voltage code generation block 630 may output a power supply voltage code ECODE based on the voltage drop signal SVD and a voltage code lookup table VC LUT. The voltage code generation block 630 may receive the voltage drop signal SVD from the current sensing block 620. The voltage code generation block 630 may receive the vertical start signal from the driving controller 200. The voltage code generation block 630 may generate the power supply voltage code ECODE based on the voltage code lookup table VC LUT.

In an embodiment, the voltage code generation block 630 may output the power supply voltage code ECODE corresponding to a type of the voltage drop signal SVD and an activation start time of the voltage drop signal SVD among a plurality of power supply voltage codes ECODE stored in the voltage code lookup table VC LUT. In one embodiment, for example, the type of the voltage drop signal SVD may be one of the first voltage drop signal SVD1, the second voltage drop signal SVD2, and the third voltage drop signal SVD3.

The voltage code generation block 630 may receive the vertical start signal from the driving controller 200. The vertical start signal STV may be a signal representing the start of the $N^{th}$ frame. The voltage code generation block 630 may calculate the activation start time of the voltage drop signal SVD based on the vertical start signal. In one embodiment, for example, the voltage code generation block 630 may calculate a line to which the voltage drop signal SVD is input with the activation level. The line to which the voltage drop signal SVD is input with the activation level may be proportional to the activation start time of the voltage drop signal SVD. The voltage code generation block 630 may compare the vertical start signal with the line to which the voltage drop signal SVD is input with the activation level to calculate the activation start time of the voltage drop signal SVD.

As shown in FIG. 5, the voltage code lookup table VC LUT may store drop data of the power supply voltage ELVDD corresponding to the type of the voltage drop signal SVD and the activation start time of the voltage drop signal SVD. As the activation start time of the voltage drop signal SVD becomes earlier, a voltage level of the power supply voltage ELVDD may drop more. In one embodiment, for example, the voltage level of the power supply voltage ELVDD may drop more in a case where the line to which the voltage drop signal SVD is input with the activation level is a first line as compared with a case where the line to which the voltage drop signal SVD is input with the activation level is a $2160^{th}$ line. As the voltage drop signal SVD becomes a voltage drop signal SVD corresponding to a higher reference current, the voltage level of the power supply voltage ELVDD may drop more. In one embodiment, for example, the voltage level of the power supply voltage ELVDD may drop more in a case where the third voltage drop signal SVD3 is input as compared with a case where the first voltage drop signal SVD1 is input. In this case, the voltage level of the power supply voltage ELVDD may drop by a step level SL. The voltage code generation block 630 may output the power supply voltage code ECODE to the power supply voltage DAC block 640.

The power supply voltage DAC block 640 may receive the power supply voltage code ECODE from the voltage code generation block 630. The power supply voltage DAC block 640 may generate an analog voltage AVOLT corresponding to the power supply voltage code ECODE. The power supply voltage DAC block 640 may output the analog voltage AVOLT to the power supply voltage generation block 610.

The power supply voltage generation block 610 may receive the analog voltage AVOLT from the power supply voltage DAC block 640. The power supply voltage generation block 610 may control the voltage level of the power supply voltage ELVDD based on the analog voltage AVOLT. When the voltage level of the power supply voltage ELVDD drops or rises based on the analog voltage AVOLT, the current level of the power supply current IEL flowing in the display panel 100 may vary. Therefore, in such an embodiment the display device, the voltage level of the power supply voltage ELVDD may be controlled when the overcurrent flows in the display panel 100, so that occurrence of the overcurrent may be minimized, and the display panel 100 may be effectively prevented from being damaged.

Figure 6:
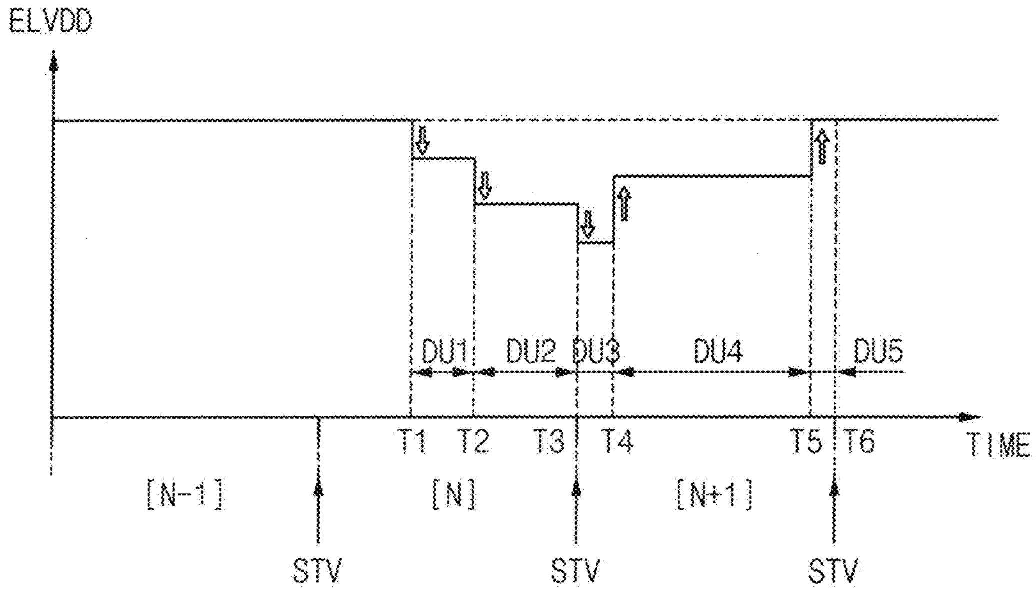
FIG. 6 is a graph showing that the power supply voltage generator of FIG. 4 controls a power supply voltage.
Figure 7:
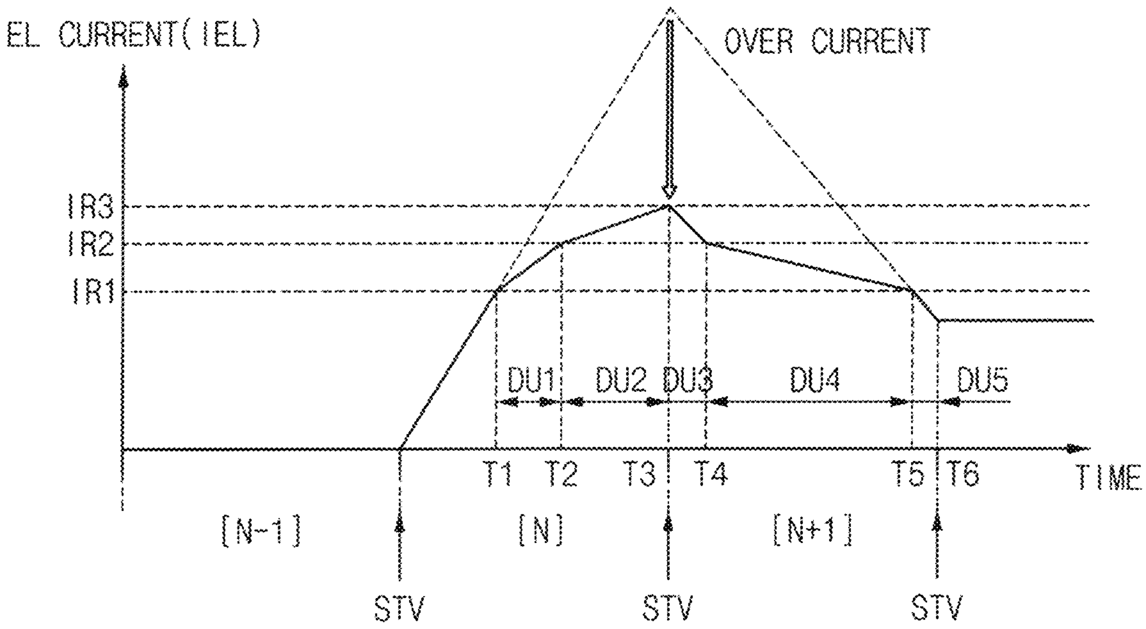
FIG. 7 is a graph showing that a power supply current is controlled as a power supply voltage is changed.

FIG. 6 is a graph showing that the power supply voltage generator of FIG. 4 controls a power supply voltage, and FIG. 7 is a graph showing that a power supply current is controlled as a power supply voltage is changed.

Referring to FIGS. 1 to 6, in an embodiment, the power supply voltage generator 600 may sense the power supply current IEL applied to the display panel 100 and control the power supply voltage ELVDD based on the current level of the power supply current IEL in the $N^{th}$ frame in which the net power control does not operate. When the power supply voltage ELVDD is controlled, the current level of the power supply current IEL may vary.

At a first time point T1, the current sensing block 620 may sense that the power supply current IEL is greater than the first reference current IR1. The first reference current IR1 may have a current level that does not damage the display panel 100. The current sensing block 620 may output the first voltage drop signal SVD1 to the voltage code generation block 630 with the activation level. The voltage code generation block 630 may output the power supply voltage code ECODE based on the first voltage drop signal SVD1 and the first time point T1. The power supply voltage DAC block 640 may output the analog voltage AVOLT corresponding to the power supply voltage code ECODE to the power supply voltage generation block 610. The power supply voltage generation block 610 may decrease the voltage level of the power supply voltage ELVDD based on the analog voltage AVOLT. When the power supply voltage ELVDD drops at the first time point T1, a slope of the power supply current IEL may vary. In an embodiment, the power supply current IEL may have a smaller increase during a first period DU1 than a period before the first period DU1.

At a second time point T2, the current sensing block 620 may sense that the power supply current IEL is greater than the second reference current IR2. The second reference current IR2 may have a higher current level than the first reference current IR1. The current sensing block 620 may output the second voltage drop signal SVD2 to the voltage code generation block 630 with the activation level. The voltage code generation block 630 may output the power supply voltage code ECODE based on the second voltage drop signal SVD2 and the second time point T2. The power supply voltage DAC block 640 may output the analog voltage AVOLT corresponding to the power supply voltage code ECODE to the power supply voltage generation block 610. The power supply voltage generation block 610 may decrease the voltage level of the power supply voltage ELVDD based on the analog voltage AVOLT. When the power supply voltage ELVDD drops at the second time point T2, the slope of the power supply current IEL may vary. In an embodiment, the power supply current IEL may have a smaller increase during a second period DU2 than the first period DU1.

At a third time point T3, the current sensing block 620 may sense that the power supply current IEL is greater than the third reference current IR3. The third reference current IR3 may have a higher current level than the second reference current IR2. The third reference current IR3 may be a minimum overcurrent that damages the display panel 100. The current sensing block 620 may output the third voltage drop signal SVD3 to the voltage code generation block 630 with the activation level. The voltage code generation block 630 may output the power supply voltage code ECODE based on the third voltage drop signal SVD3 and the third time point T3. The power supply voltage DAC block 640 may output the analog voltage AVOLT corresponding to the power supply voltage code ECODE to the power supply voltage generation block 610. The power supply voltage generation block 610 may decrease the voltage level of the power supply voltage ELVDD based on the analog voltage AVOLT. When the power supply voltage ELVDD drops at the third time point T3, the slope of the power supply current IEL may vary. In an embodiment, the power supply current IEL may be decreased during a third period DU3.

At a fourth time point T4, the current sensing block 620 may sense that the power supply current IEL is smaller than the second reference current IR2. The current sensing block 620 may output the second voltage drop signal SVD2 to the voltage code generation block 630 with a deactivation level. In this case, the power supply voltage generation block 610 may increase the voltage level of the power supply voltage ELVDD. When the power supply voltage ELVDD rises at the fourth time point T4, the slope of the power supply current IEL may vary. In an embodiment, the power supply current IEL may have a smaller decrease during a fourth period DU4 than the third period DU3.

At a fifth time point T5, the current sensing block 620 may sense that the power supply current IEL is smaller than the first reference current IR1. The current sensing block 620 may output the first voltage drop signal SVD1 to the voltage code generation block 630 with a deactivation level. In this case, the power supply voltage generation block 610 may increase the voltage level of the power supply voltage ELVDD. When the power supply voltage ELVDD rises at a fifth time point T5, the slope of the power supply current IEL may vary. In other words, the power supply current IEL may have a smaller decrease at a sixth time point T6 during a fifth period DU5 than the fourth period DU4.

In an embodiment, as described above, when the voltage level of the power supply voltage ELVDD drops or rises based on the analog voltage AVOLT, the current level of the power supply current IEL flowing in the display panel 100 may vary during the first period DU1 to the fifth period DU5. Therefore, according to an embodiment of the display device, the voltage level of the power supply voltage ELVDD may be controlled when the overcurrent flows in the display panel 100, so that the occurrence of the overcurrent may be minimized, and the display panel 100 may be effectively prevented from being damaged.

Figure 8:
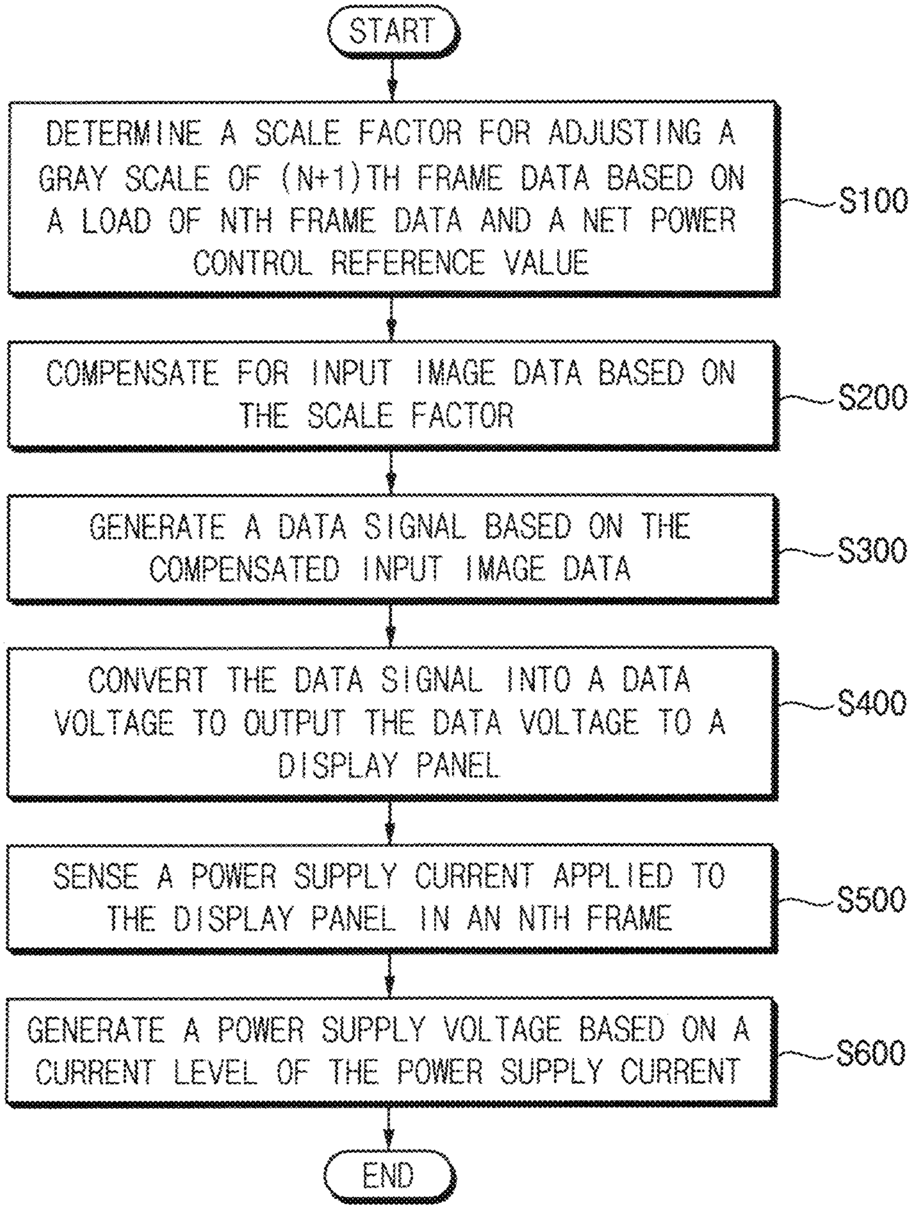
FIG. 8 is a flowchart showing an operation of the display device of FIG. 1.

FIG. 8 is a flowchart showing an operation of the display device of FIG. 1.

Referring to FIGS. 1, 4, and 8, an embodiment of the display device may determine a scale factor for adjusting a gray scale of (N+1) th frame data based on a load of $N^{th}$ frame data and a net power control reference value (S100), may compensate input image data based on the scale factor (S200), may generate a data signal based on the compensated input image data (S300), may convert the data signal into a data voltage to output the data voltage to a display panel 100 (S400), may sense a power supply current IEL applied to the display panel 100 in an $N^{th}$ frame (S500), and may generate a power supply voltage ELVDD based on a current level of the power supply current IEL (S600).

In an embodiment, the display device may determine the scale factor for adjusting the gray scale of the (N+1) th frame data based on the load of the $N^{th}$ frame data and the net power control reference value (S100), may compensate the input image data based on the scale factor (S200), may generate the data signal based on the compensated input image data (S300), and may convert the data signal into the data voltage to output the data voltage to the display panel 100 (S400).

In an embodiment, the driving controller 200 may include a net power control setter 230. In such an embodiment, the net power control setter 230 may determine the scale factor SF[N+1] for adjusting the gray scale of the $(N+1)^{th}$ frame data based on the load LD[N] of the $N^{th}$ frame data IMG[N] and the net power control reference value. In such an embodiment, the net power control setter 230 may generate a net power control signal NPC[N+1] representing whether net power control is activated or deactivated in the $(N+1)^{th}$ frame data. The driving controller 200 may compensate the input image data based on the scale factor. The scale factor SF[N+1] may have a value that is less than or equal to 1 to maintain or reduce a gray scale of the input image data. The driving controller 200 may generate the data signal based on the compensated input image data.

The data driver 500 may receive the second control signal $CONT^2$ and the data signal DATA from the driving controller 200, and may receive the gamma reference voltage VGREF from the gamma reference voltage generator 400. The data driver 500 may convert the data signal DATA into an analog data voltage by using the gamma reference voltage VGREF. The data driver 500 may output the data voltage to the display panel 100.

In an embodiment, the display device may sense the power supply current IEL applied to the display panel 100 in the $N^{th}$ frame (S500) and may generate the power supply voltage ELVDD based on the current level of the power supply current IEL (S600). The power supply voltage generator 600 may sense the power supply current IEL applied to the display panel 100 and generate the power supply voltage ELVDD based on the current level of the power supply current IEL in the $N^{th}$ frame in which the net power control does not operate. In an embodiment, the power supply voltage generator 600 may include a power supply voltage generation block 610, a current sensing block 620, a voltage code generation block 630, and a power supply voltage DAC block 640. The power supply voltage generator 600 may generate the power supply voltage ELVDD, and output the power supply voltage ELVDD to the display panel 100.

In such an embodiment, the current sensing block 620 may sense the power supply current IEL, and generate a voltage drop signal SVD based on the current level of the power supply current IEL and a reference current lookup table IR LUT. The current sensing block 620 may receive the power supply current IEL from the power supply voltage generation block 610. The current sensing block 620 may receive a reference current from the reference current lookup table IR LUT. The current sensing block 620 may compare the power supply current IEL with the reference current. The current sensing block 620 may output the voltage drop signal SVD with an activation level when the power supply current IEL is greater than the reference current.

In such an embodiment, the voltage code generation block 630 may output a power supply voltage code ECODE based on the voltage drop signal SVD and a voltage code lookup table VC LUT. The voltage code generation block 630 may receive the voltage drop signal SVD from the current sensing block 620. The voltage code generation block 630 may receive the vertical start signal from the driving controller 200. The voltage code generation block 630 may generate the power supply voltage code ECODE based on the voltage code lookup table VC LUT.

In such an embodiment, the power supply voltage DAC block 640 may receive the power supply voltage code ECODE from the voltage code generation block 630. The power supply voltage DAC block 640 may generate an analog voltage AVOLT corresponding to the power supply voltage code ECODE. The power supply voltage DAC block 640 may output the analog voltage AVOLT to the power supply voltage generation block 610.

The power supply voltage generation block 610 may receive the analog voltage AVOLT from the power supply voltage DAC block 640. The power supply voltage generation block 610 may control the voltage level of the power supply voltage ELVDD based on the analog voltage AVOLT. In an embodiment, as described above, when the voltage level of the power supply voltage ELVDD drops or rises based on the analog voltage AVOLT, the current level of the power supply current IEL flowing in the display panel 100 may vary. Therefore, according to an embodiment of the display device, the voltage level of the power supply voltage ELVDD may be controlled when the overcurrent flows in the display panel 100, so that the occurrence of the overcurrent may be minimized, and the display panel 100 may be effectively prevented from being damaged.

Figure 9:
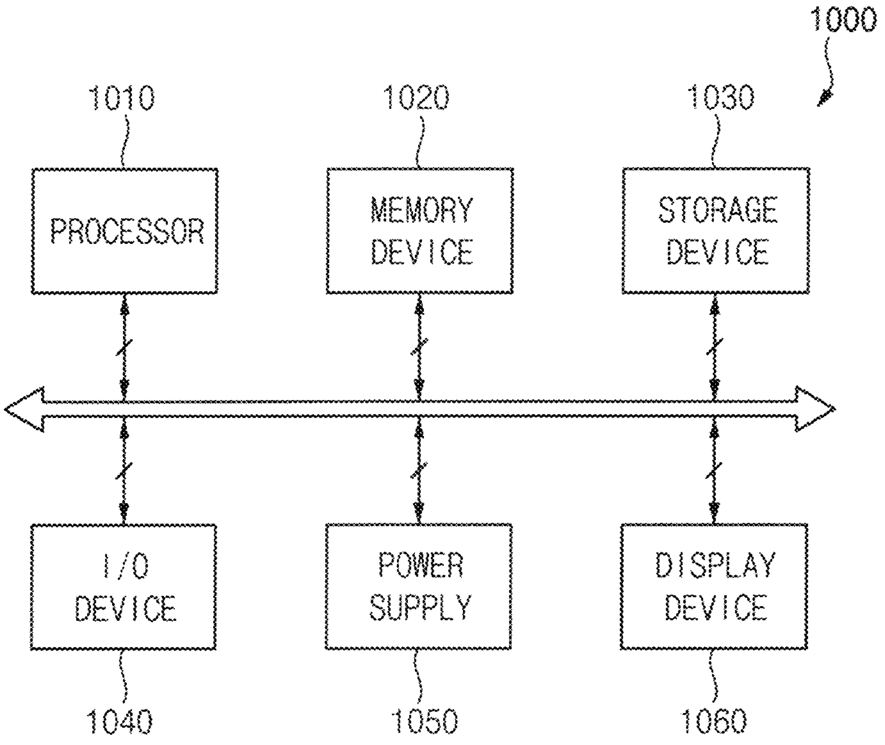
FIG. 9 is a block diagram showing an electronic device according to an embodiment.
Figure 10:
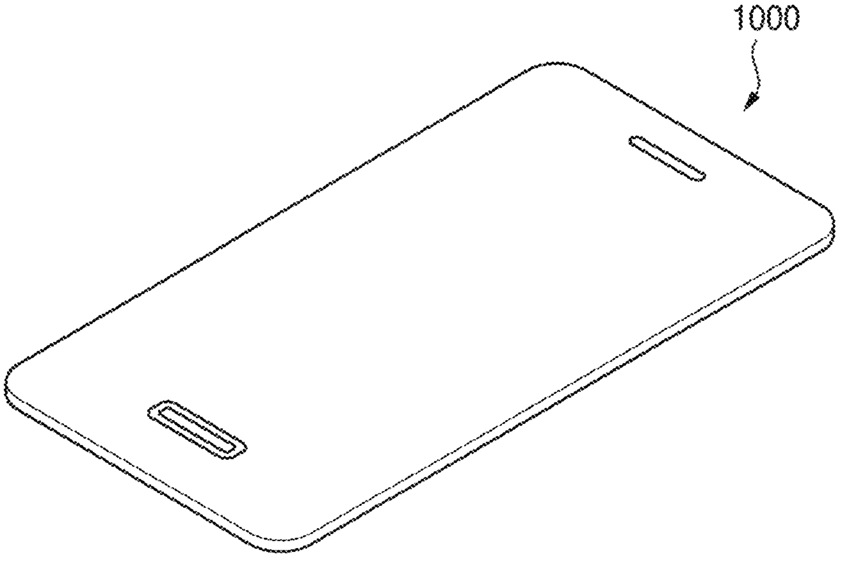
FIG. 10 is a diagram showing an embodiment in which the electronic device of FIG. 9 is implemented as a smart phone.

FIG. 9 is a block diagram showing an electronic device according to an embodiment, and FIG. 10 is a diagram showing an embodiment in which the electronic device of FIG. 9 is implemented as a smart phone.

Referring to FIGS. 9 and 10, an embodiment of the electronic device 1000 may include a processor 1010, a memory device 1020, a storage device 1030, an input/output ("I/O") device 1040, a power supply 1050, and a display device 1060. In such an embodiment, the display device 1060 may be the display device of FIG. 1. In such an embodiment, the electronic device 1000 may further include a plurality of ports for communicating with a video card, a sound card, a memory card, a universal serial bus ("USB") device, other electronic devices, etc. In an embodiment, as shown in FIG. 10, the electronic device 1000 may be implemented as a smart phone. However, the electronic device 1000 is not limited thereto. In an alternative embodiment, the electronic device 1000 may be implemented as a cellular phone, a video phone, a smart pad, a smart watch, a tablet personal computer ("PC"), a car navigation system, a computer monitor, a laptop computer or a head mounted display ("HMD") device, for example.

The processor 1010 may perform various computing functions. The processor 1010 may be a micro-processor, a central processing unit ("CPU"), an application processor ("AP"), etc. The processor 1010 may be coupled to other components via an address bus, a control bus, a data bus, etc. Further, the processor 1010 may be coupled to an extended bus such as a peripheral component interconnection ("PCI") bus. The memory device 1020 may store data for operations of the electronic device 1000. In one embodiment, for example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc. and/or at least one volatile memory device such as a dynamic random access memory ("DRAM") device, a static random access memory (SRAM) device, a mobile DRAM device, etc. The storage device 1030 may include a solid state drive ("SSD") device, a hard disk drive ("") device, a CD-ROM device, etc. The I/O device 1040 may include an input device such as a keyboard, a keypad, a mouse device, a touch pad, a touch screen, etc., and an output device such as a printer, a speaker, etc. In an embodiment, the I/O device 1040 may be included in the display device 1060. The power supply 1050 may provide power for operations of the electronic device 1000. The display device 1060 may be coupled to other components via the buses or other communication links.

The display device 1060 may display an image corresponding to visual information of the electronic device 1000. In an embodiment, the display device 1060 may include a display panel configured to display an image based on input image data, a driving controller including a net power control setter configured to determine a scale factor for adjusting a gray scale of $(N+1)^{th}$ frame data based on a load of $N^{th}$ frame data and a net power control reference value, and configured to generate a data signal based on the input image data, a data driver configured to convert the data signal into a data voltage to output the data voltage to the display panel, and a power supply voltage generator configured to sense a power supply current applied to the display panel in an $N^{th}$ frame, and generate a power supply voltage based on a current level of the power supply current. The power supply voltage generator may control a voltage level of the power supply voltage based on an analog voltage. When the voltage level of the power supply voltage drops or rises based on the analog voltage, the current level of the power supply current flowing in the display panel may vary. Therefore, according to the display device, the voltage level of the power supply voltage may be controlled when an overcurrent flows in the display panel, so that occurrence of the overcurrent may be minimized, and the display panel may be effectively prevented from being damaged. As described above, the display device 1060 is substantially the same as those described above, any repetitive detailed description thereof will be omitted. Embodiments of the disclosure may be applied to a display device and an electronic device including the display device. In one embodiment, for example, the present disclosure may be applied to a digital television, a three-dimension ("3D") television, a cellular phone, a smart phone, a PC, a tablet PC, a virtual reality ("VR") device, a home appliance, a laptop computer, a personal digital assistants ("PDA"), a portable media player ("PMP"), a digital camera, a music player, a portable game console, a car navigation system, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel which displays an image based on a data voltage;

a driving controller which generates a data signal based on input image data;

a data driver which converts the data signal into the data voltage and outputs the data voltage to the display panel; and a power supply voltage generator which senses a power supply current applied to the display panel in a frame and adjusts a power supply voltage applied to the display panel based on a current level of the power supply current, wherein the driving controller performs a net power control operation for an $(N+1)^{th}$ frame, which adjusts a gray scale of $(N+1)^{th}$ frame data based on a load of $N^{th}$ frame data, where N is a natural number greater than or equal to 2.

2. The display device of claim 1, wherein the driving controller determines whether to perform the net power control operation for the $(N+1)^{th}$ frame by calculating a sum of all gray scales of the $N^{th}$ frame data, by calculating the load of the $N^{th}$ frame data based on the sum of all gray scales of the $N^{th}$ frame data, and by checking whether the load of the $N^{th}$ frame data is greater than a net power control reference value.

3. The display device of claim 1, wherein the power supply voltage generator includes:

a power supply voltage generation block which generates the power supply voltage;

a current sensing block which senses the power supply current and generates a voltage drop signal based on the current level of the power supply current and a reference current lookup table;

a voltage code generation block which outputs a power supply voltage code based on the voltage drop signal and a voltage code lookup table; and a power supply voltage digital-to-analog converter block which generates an analog voltage corresponding to the power supply voltage code.

4. The display device of claim 3, wherein the current sensing block receives a reference current from the reference current lookup table, compares the power supply current with the reference current, and outputs the voltage drop signal with an activation level when the power supply current is greater than the reference current.

5. The display device of claim 4, wherein the reference current lookup table stores a first reference current, a second reference current which is greater than the first reference current, and a third reference current which is greater than the second reference current.

6. The display device of claim 5, wherein the current sensing block outputs a first voltage drop signal with an activation level when the power supply current is greater than the first reference current, outputs a second voltage drop signal with an activation level when the power supply current is greater than the second reference current, and outputs a third voltage drop signal with an activation level when the power supply current is greater than the third reference current.

7. The display device of claim 3, wherein the voltage code generation block receives the voltage drop signal from the current sensing block, receives a vertical start signal from the driving controller, and calculates an activation start time of the voltage drop signal based on the vertical start signal.

8. The display device of claim 7, wherein the voltage code generation block outputs the power supply voltage code corresponding to a type of the voltage drop signal and the activation start time of the voltage drop signal among a plurality of power supply voltage codes stored in the voltage code lookup table.

9. The display device of claim 8, wherein the power supply voltage generation block receives the analog voltage from the power supply voltage digital-to-analog converter block and controls a voltage level of the power supply voltage based on the analog voltage.

10. A method of driving a display device, the method comprising:

displaying an image on a display panel;

sensing a power supply current applied to the display panel in a frame;

generating a power supply voltage based on a current level of the power supply current; and performing a net power control operation for an $(N+1)^{th}$ frame, which adjusts a gray scale of $(N+1)^{th}$ frame data based on a load of $N^{th}$ frame data, where N is a natural number greater than or equal to 2.

11. The method of claim 10, wherein the net power control operation for the $(N+1)^{th}$ frame is determined whether to be performed by calculating a sum of all gray scales of the $N^{th}$ frame data, by calculating the load of the $N^{th}$ frame data based on the sum of all gray scales of the $N^{th}$ frame data, and by checking whether the load of the $N^{th}$ frame data is greater than a net power control reference value.

12. The method of claim 10, wherein the generating the power supply voltage includes:

generating a voltage drop signal based on the current level of the power supply current and a reference current lookup table;

outputting a power supply voltage code based on the voltage drop signal and a voltage code lookup table; and generating an analog voltage corresponding to the power supply voltage code.

13. The method of claim 12, wherein the generating the voltage drop signal includes:

receiving a reference current from the reference current lookup table;

comparing the power supply current with the reference current; and outputting the voltage drop signal with an activation level when the power supply current is greater than the reference current.

14. The method of claim 13, wherein the reference current lookup table stores a first reference current, a second reference current which is greater than the first reference current, and a third reference current which is greater than the second reference current.

15. The method of claim 14, wherein the generating the voltage drop signal includes:

outputting a first voltage drop signal with an activation level when the power supply current is greater than the first reference current;

outputting a second voltage drop signal with an activation level when the power supply current is greater than the second reference current; and outputting a third voltage drop signal with an activation level when the power supply current is greater than the third reference current.

16. The method of claim 12, wherein the outputting the power supply voltage code includes:

calculating an activation start time of the voltage drop signal based on a vertical start signal.

17. The method of claim 16, wherein the outputting the power supply voltage code includes:

outputting the power supply voltage code corresponding to a type of the voltage drop signal and the activation start time of the voltage drop signal among a plurality of power supply voltage codes stored in the voltage code lookup table.

18. The method of claim 17, wherein the generating the power supply voltage further includes:

controlling a voltage level of the power supply voltage based on the analog voltage.

* * * * *